March 22, 1938.
T. R. HARRISON
2,112,091
CONTROL INSTRUMENT
Filed Feb. 5, 1934
5 Sheets-Sheet 1
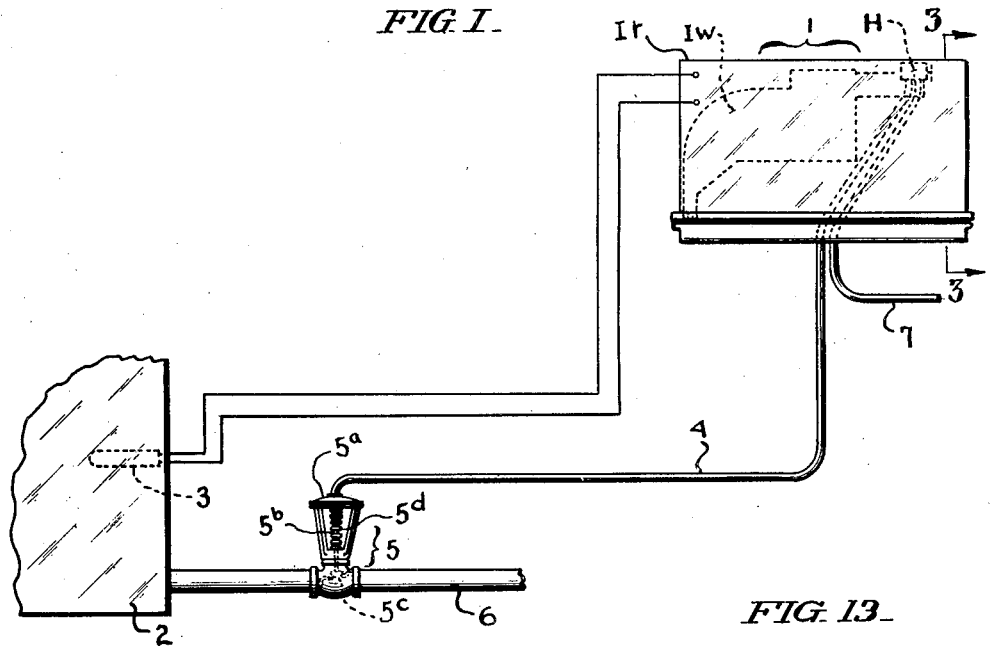
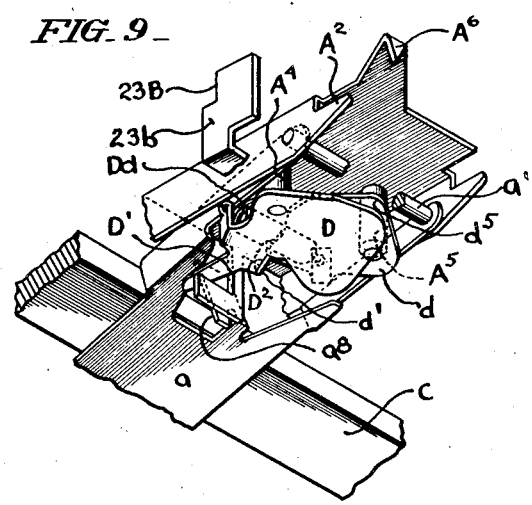
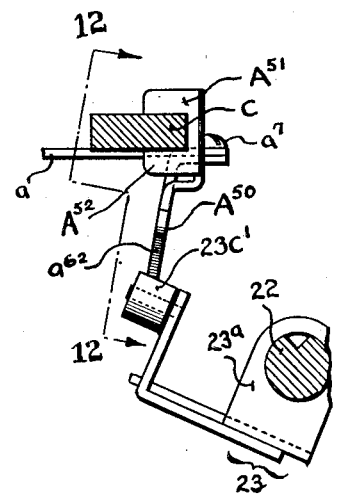
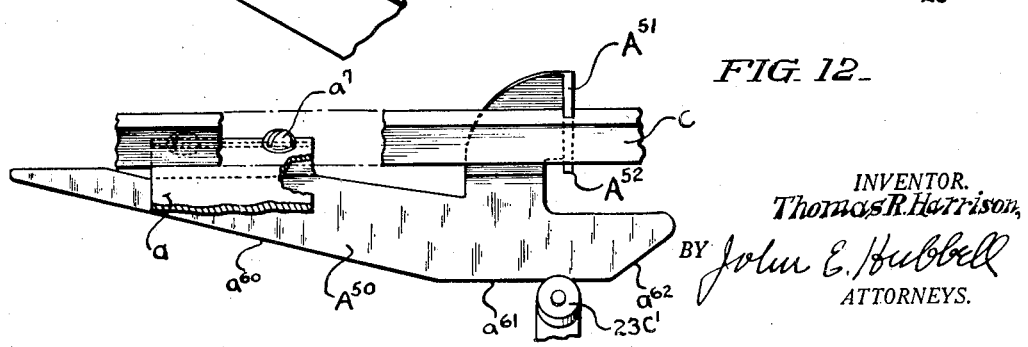
INVENTOR.
Thomas R. Harrison,
BY John E. Hubbell
ATTORNEYS.

March 22, 1938.   T. R. HARRISON   2,112,091
CONTROL INSTRUMENT
Filed Feb. 5, 1934   5 Sheets-Sheet 2

INVENTOR.
Thomas R. Harrison,
BY John E. Hubbell
ATTORNEYS.

March 22, 1938.  T. R. HARRISON  2,112,091
CONTROL INSTRUMENT
Filed Feb. 5, 1934  5 Sheets-Sheet 3
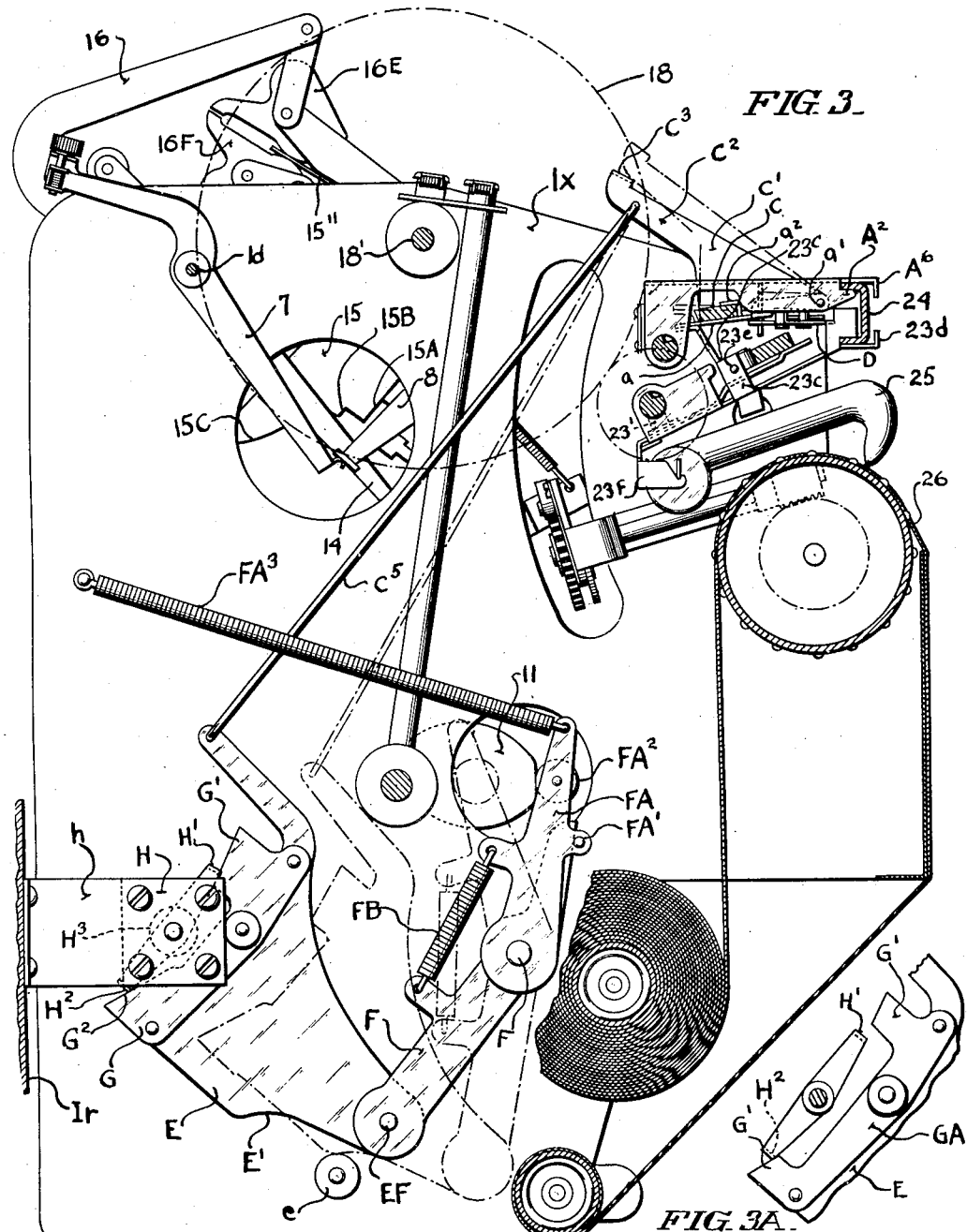
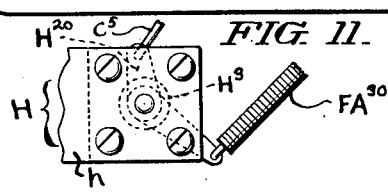
INVENTOR.
Thomas R. Harrison,
BY John E. Hubbell
ATTORNEYS.

March 22, 1938.    T. R. HARRISON    2,112,091
CONTROL INSTRUMENT
Filed Feb. 5, 1934    5 Sheets-Sheet 4
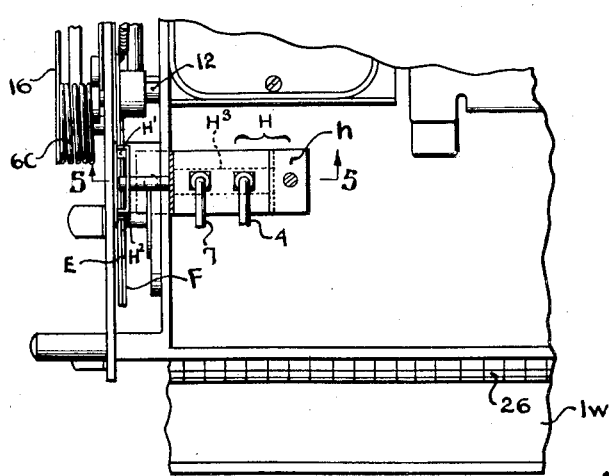
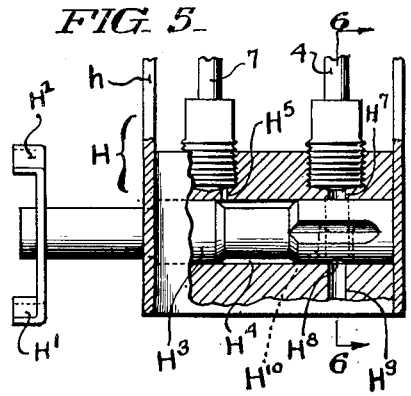
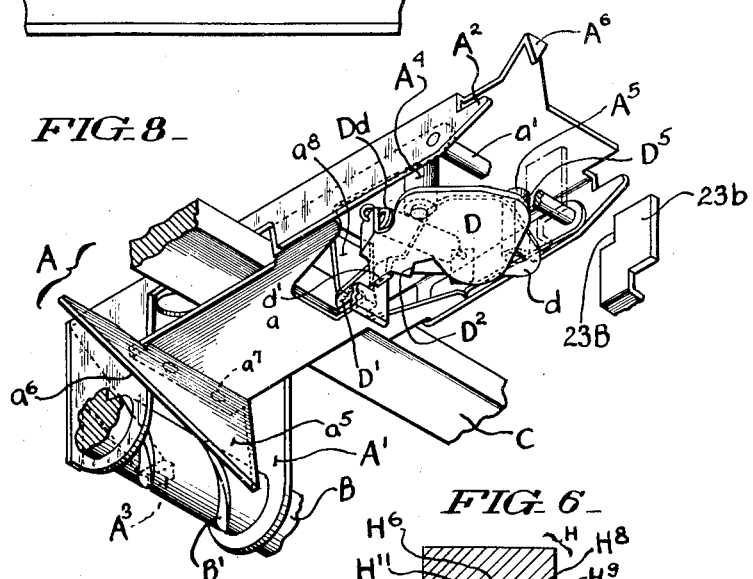
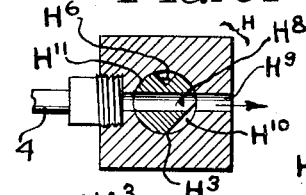
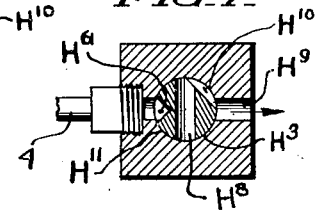
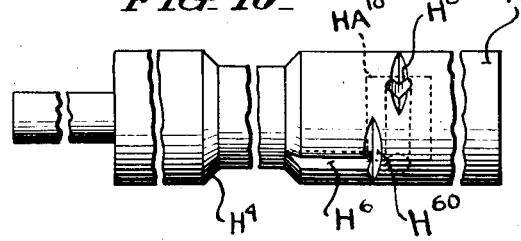
INVENTOR.
Thomas R. Harrison,
BY John E. Hubbell
ATTORNEYS.

Patented Mar. 22, 1938

2,112,091

UNITED STATES PATENT OFFICE 2,112,091

CONTROL INSTRUMENT

Thomas R. Harrison, Wyncote, Pa., assignor to The Brown Instrument Company, Philadelphia, Pa., a corporation of Pennsylvania Application February 5, 1934, Serial No. 709,785

20 Claims. (Cl. 236—70)

The general object of the present invention is to provide an improved control instrument characterized by the novel manner in which a potentiometer meter mechanism which measures the varying values of a controlling quantity or condition is combined with pneumatic control provisions to create control effects dependent upon the variations in said values.

Potentiometer control instruments of various forms have heretofore been devised by me and by others in which the adjustments of the potentiometer mechanism resulting from changes in value of the controlling quantity measured have actuated electric controlling devices to thereby vary or effect the energization of control mechanisms which usually consist of or comprise electric relays of one form or another, to thereby create control effects dependent on the values or change in values of a controlling quantity or condition. Control instruments have also been devised by me and others in which a simple meter element, for example, a Bourdon tube or other pressure gauge, responsive to fluid pressure changes, actuates a pilot valve mechanism to thereby maintain a control air pressure varying in correspondence with changes in value of the quantity measured by the meter element and employed to actuate or adjust control devices.

A primary object of the present invention is to provide an air actuated potentiometer control instrument in which a desirable form of self-balancing potentiometer meter mechanism is combined with an air actuated controller pilot valve mechanism in a simple and effective manner, and so as to take full advantage of desirable characteristics of each of said mechanisms.

In my Patent No. 1,946,280, granted February 6, 1934, on an application filed by me prior to, but which was co-pending with my present application, I have disclosed a self-balancing potentiometer control instrument in which the potentiometer mechanism effects control functions through circuit controlling devices which has been put into successful commercial use and which possesses important novel characteristics devised by me. A specific object of the present invention is to provide a control instrument making use of distinctive characteristics of the potentiometer instrument disclosed in my above mentioned patent, to effect control actions through a pilot valve mechanism combined with said potentiometer mechanism effectively and in such manner as to require only relatively small changes in the existing commercial form of the instrument disclosed in said prior application. Another specific object of the present invention is to provide a pilot valve mechanism desirably characterized in part by its availability for use in an air actuated potentiometer control instrument and in part by novel characteristics contributing to a desirable flexibility and accuracy of control and some of the features of which are adapted for use in control instruments in which the meter mechanism comprises a simple meter element such as a Bourdon tube.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is a diagrammatic representation of a control system in which an air actuated potentiometer control instrument regulates the fuel supply to a furnace in accordance with a temperature condition of the latter;

Fig. 3 is a cross section of the instrument of Figs. 1 and 2 taken on the line 3—3 of Fig. 1 with parts broken away and in section;

Fig. 3A illustrates a modification of a portion of the apparatus shown in Fig. 3;

Fig. 4 is a rear elevation of a portion of the instrument shown in Fig. 1;

Fig. 5 is an elevation, partly in section on the line 5—5 of Fig. 4, of the pilot valve employed in the arrangement shown in Fig. 1;

Fig. 6 is a section on the line 6—6 of Fig. 5;

Fig. 7 is a section taken similarly to Fig. 6, but with parts in different relative positions;

Fig. 8 is a perspective view of an instrument control table;

Fig. 9 is a perspective view of a portion of the table shown in Fig. 8 but with parts in different relative positions;

Fig. 10 is an elevation of a modified form of the valve member of Figs. 5, 6 and 7;

Fig. 11 is a view taken similarly to Fig. 3 illustrating a modified arrangement for oscillating the movable pilot valve member;

Fig. 12 is a front elevation, and Fig. 13 an end elevation, illustrating a control table modification.

Figure 2:
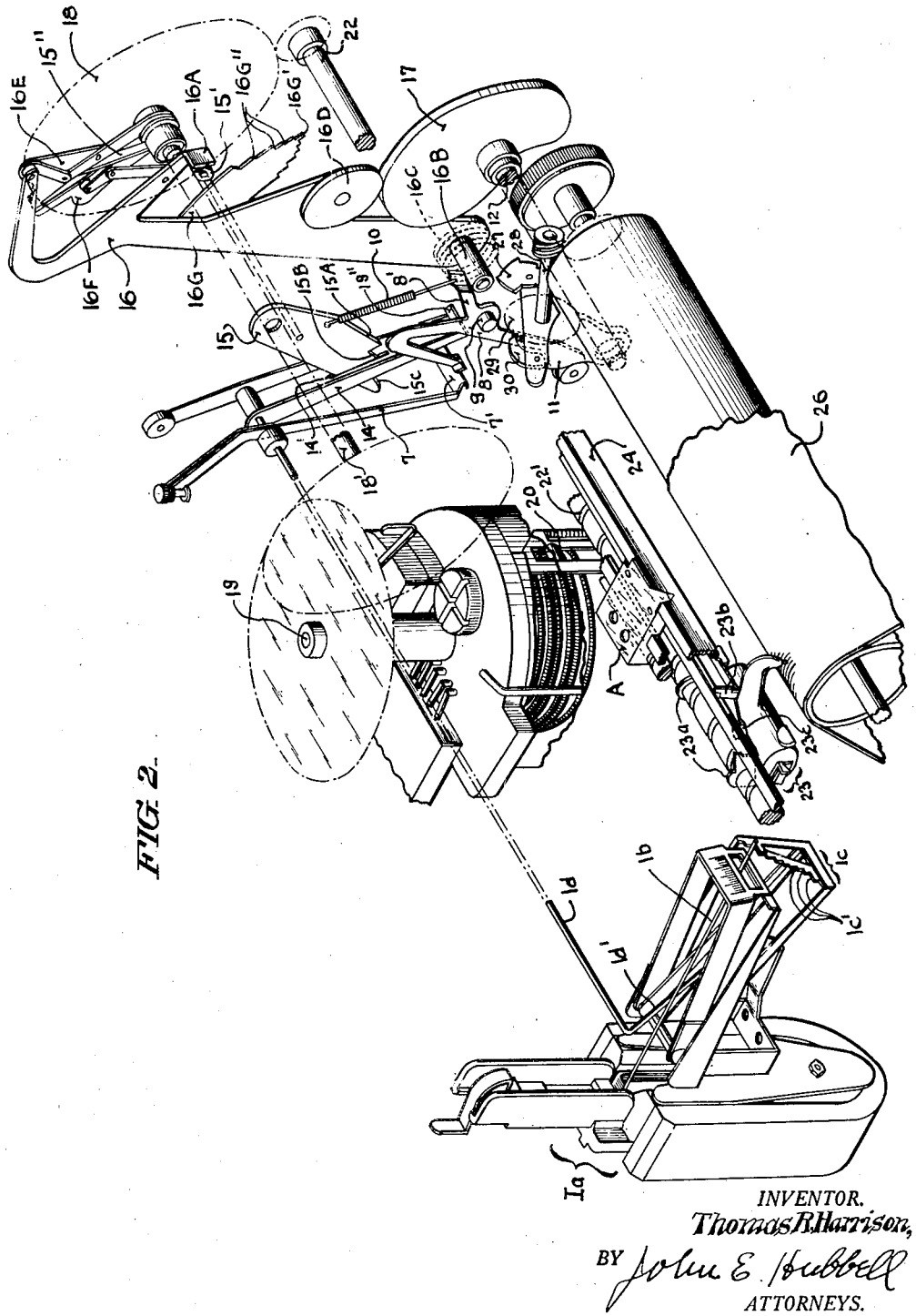
Fig. 2 is a perspective view of some of the operating parts of the potentiometer instrument employed in the arrangement shown in Fig. 1, certain of the parts being relatively displaced to more clearly show their arrangement.

In the control system illustrated by way of example in Fig. 1, a potentiometer control instrument 1 is employed to measure the temperature condition in a furnace 2 to which a thermo-couple 3 is subjected, the thermo-couple having its terminals connected to the potentiometer measuring circuit of the instrument 1 which comprises mechanism through which an air pressure modified by the instrument in accordance with variations in the temperature to which the thermocouple 3 is subjected is transmitted to the pressure chamber of a fluid pressure control valve 5 regulating the flow of a gas or liquid through the supply pipe 6 to the combustion chamber of the furnace 2. The air controlled mechanism of the instrument 1 is connected by a pipe 7 to a source of air under pressure.

The instrument 1 comprises operative parts shown in detail in Fig. 2 for effecting potentiometer measuring and recording functions which include a galvanometer 1a, the pointer 1b of which deflects in response to a condition of unbalance in a potentiometer measuring circuit resulting from changes in the temperature to which the thermocouple 3 is subjected, which may be of any usual or suitable form including a resistance adjusted to unbalance the potentiometer. The instrument also comprises mechanical relay provisions operated by a constantly rotating motor not shown and controlled by the deflection of the galvanometer pointer 1b away from its normal zero position, which periodically rebalance the potentiometer and move a pen or record carriage 23 along a travelling recording strip 26 to record the varying value of the quantity measured on said strip. In respect to the means shown for effecting potentiometer measuring and recording functions, the instrument 1 is of the form disclosed in an application for patent, Serial No. 546,290 filed June 23, 1931, jointly by Ernest H. Grauel, Ernest Kessler and myself.

The control provisions of the instrument 1 comprise a control table A and means by which a pneumatic control mechanism is periodically actuated by the above mentioned potentiometer rebalancing and carriage adjusting mechanism. When the recording carriage 23 is displaced in one direction or the other from the control table A, which normally is stationary but may be manually adjusted along the path of movement of the carriage 23. The position of the table A along said path corresponds to and determines the normal value of the temperature of the thermocouple 3, while the position at any instant of the carriage 23 corresponds to and constitutes a measure of the temperature of said quantity at that instant.

The mechanism of the instrument 1 through which the deflection of the galvanometer pointer 1b controls the adjustments of the recording carriage 23 and the rebalancing of the potentiometer circuit, comprises a pointer engaging and position gauging element 1c. The latter is pivotally supported, and in connection with a cooperating rock shaft 1d has a loading tendency due partly to spring and partly to gravitational action, to turn upward into the position in which one or another of the shoulders 1c' of the member 1c engage the galvanometer pointer 1b. The member 1c is engaged by and turns with the arm 1d' of the rock shaft 1d. A spring 10 tends to hold a rocker 8 which is journalled on a pivot 9 in the position in which the rocker engages an arm 7 secured to the shaft 1d and thereby holds the latter in a position in which the shoulders 1c' are all below the pointer 1b.

A cam 11 which is carried by a shaft 12 is constantly rotated by the instrument driving motor through a speed reduction gearing, turns the rocker 8 about its pivot against the action of the spring 10, one during each revolution of the shaft 12. This allows the arm 7 to turn counter-clockwise, as seen in Fig. 2, until the corresponding angular movement of the shaft 1d is interrupted by the engagement of one or another of the shoulders 1c' of the member 1c with the galvanometer pointer 1b. The shoulders 1c' are so arranged that the turning movement of the shaft 1d and arm 7 thus permitted, will be greater or less according to the deflective position of the pointer 1b at the time. When the arm 7 thus turns counter-clockwise, a lateral projection 7' of that arm engages and turns a secondary pointer element 14 into a position corresponding to the then deflection of the pointer 1b. The secondary pointer 14 is loosely journalled on the shaft 1d, and has a gravital loading tendency to turn in the clockwise direction as seen in Fig. 2, so that the arm 14 normally bears against the projection 7' of the arm 7.

At the end of each angular adjustment of the secondary pointer 14 into a position corresponding to the then deflection of the galvanometer, one or another of the three shoulders 15A, 15B and 15C of a locking member 15 engages the bottom wall of a slot 14' in the member 14 and thereby frictionally holds the latter in the position occupied by it when such engagement occurs. When the pointers 1b and 14 occupy their neutral positions, the shoulder 15B of the member 15 comes into locking engagement with the member 14. When the galvanometer pointer 1b has deflected to the right as seen in Fig. 2, as it does when the actual value of the quantity measured is lower than that indicated by the previously made and still existing potentiometer adjustment, the secondary pointer 14 is engaged and locked by the shoulder 15C. When the galvanometer pointer deflects in the opposite direction from its neutral position, as it does when the actual value of the quantity measured is higher than that indicated by the existing potentiometer adjustment, the pointer 14 is engaged and locked by the shoulder 15A of the member 15. The locking part 15 is given a tendency to move into locking engagement with the secondary pointer 14 by the spring 10, but is periodically held out of such engagement by the action on its projection 15' of a projection 16A carried by a rachet lever 16 pivoted at 16B.

A spring 16C gives the lever 16 a tendency to turn forward in the clockwise direction as seen in Fig. 2, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls has a gravital tendency to occupy a position in which it does not engage the teeth of the wheel 18, but one or the other of the pawls is brought into engagement with the teeth of the wheel, on each forward or clockwise movement of the lever 16, if the locking part 15 is then at one side or the other of the intermediate or neutral position which it occupies when the galvanometer pointer 1b is in its neutral position.

The position assumed by the part 15 when in locking engagement with the secondary pointer 14, controls the action of the pawls 16E and 16F by virtue of the fact that a collar or hub portion 15' of the part 15 carries a spring pawl engaging arm 15". The movement of the locking part 15 into the position in which its shoulder 15A engages the secondary pointer 14 causes the arm 15" to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15C engages the secondary pointer 14, the arm 15" shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14" of the secondary pointer 14 and thereby arrest the forward movement of the ratchet lever 16. In the neutral position of the galvanometer pointer and secondary pointer 14, the projection 14" of the latter engages the central shoulder 16G' of the arm 16G and the lever 16 is then held against any operative movement in the clockwise direction. When the secondary pointer position is more or less to one side or the other of its neutral position, the pointer 14 engages an upper or lower shoulder 16G" more or less distant, respectively, from the central shoulder 16G', and the lever 16 is then permitted more or less forward movement.

The rotation of the wheel 18 in one direction or the other effects corresponding potentiometer rebalancing adjustments and position adjustments of the recorder carriage 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustment made in response to a deflection of the galvanometer pointer in one direction away from its neutral positions rebalances, or tends to rebalance the potentiometer circuit and thereby returns, or tends to return, the galvanometer pointer to its neutral position. The details of the mechanism by which the rotation of the shaft 19 thus varies the resistance in the potentiometer circuit are fully disclosed in said prior application, Serial No. 546,290, and need not be further described for that reason, as well as for the reason that such details form no part of the present invention.

The rotation of the wheel 18 adjusts the recorder carriage 23 by virtue of the fact that the teeth of the wheel 18 are in mesh with the teeth of a gear carried by a carriage adjusting shaft 22. The latter is formed with a thread groove 22' of coarse pitch which receives a cam or mutilated screw thread rib 23' secured to the carriage 23, so that the latter is moved longitudinally of the shaft 22 as the latter is rotated. The carriage 23 comprises a frame portion formed of a single piece of sheet metal cut and bent to form a flat underbody portion with uprising projections including two rear apertured ears 23a through which the shaft 22 extends; two front projections 23b which bear against a channel bar or rail 24 forming part of the instrument framework, three intermediate projections 23c which extend in vertical planes transverse to, and are arranged in a row parallel to, the shaft 22 and rail 24; a pointer or index 23d cooperating with a scale on the front face of the rail 24 to indicate the position of the pen carriage, and the value of the quantity measured and recorded by the instrument.

The projections 23c support a small shaft 23e forming a support for a pen support 23f on which the pen 25 is pivotally supported with its marking end in engagement with a record sheet 26.

The record sheet 26 passes over and is given feeding or advancing movements by a record feed roll 27 which is intermittently rotated by means of a worm and screw connection between its shaft and a transverse shaft 28 carrying a ratchet wheel 29. The ratchet wheel 29 is engaged and moved by a ratchet lever 30 engaged and oscillated by the arm 8' of the rocker 8 on each oscillation of the latter.

The instrument control table A shown best in Fig. 8, comprises a sheet metal frame having ear portions A' apertured for the passage of a shaft B mounted in the instrument framework alongside the shaft 22 and having bearing parts $A^2$ which engage and slide along the upper flange of the rail 24. The shaft B is shown as formed with a thread groove B' receiving a cam or mutilated thread rib part $A^3$ secured to the control table frame. The rotation of the shaft B which may be effected manually adjusts the control table along the path of movement of the carriage 23. The table A carries an index $A^6$ cooperating with a scale on the front face of the rail 24 to indicate the adjustment of the table and the corresponding normal value of the quantity measured.

A member $a$ is hinged at one edge to the frame of the control table A by a pivot or pintle shaft $a'$ extending parallel to the shaft B. The member $a$ is formed with guiding provisions, including a part $a^2$, for a bar-like part C which extends parallel to the shaft B and is rigidly secured at its opposite ends to arms C' which are pivotally connected to the instrument framework so that the yoke like structure formed by the bar C and the arms C' may turn with respect to the instrument framework about an axis coinciding with that of the hinge connection $a'$, between the table A and part $a$. The part $a$ and bar C are held by the said guiding provisions against independent turning movements about the axis of their respective pivotal supports. The part $a$ and bar C have a gravital tendency to move from their elevated positions indicated by the dotted line position of the arm C' in Fig. 3, into or toward their lowermost positions which are lower than their full line positions shown in Fig. 3. Their movement downward below their last mentioned positions is prevented by the engagement of a projection $C^3$ from the arm C' with an adjacent portion $1x$ of the instrument framework. The parts $a$ and C are positively held in their uppermost positions by the action of a spring $FA^3$, except during the portion of each revolution of the shaft 12 when the cam 11 renders the spring $FA^3$ inoperative to prevent such movement, as is hereinafter described. The extent to which the parts $a$ and C are permitted to swing downwardly from their uppermost positions during each period when the action of the cam 11 renders the spring $FA^3$ temporarily inoperative, depends upon the then relative positions of the table A and the recorder carriage 23. When the value of the quantity measured is low enough so that the carriage 23 is entirely at the low side (left-hand side as seen in Fig. 2) of the control table A, the carriage 23 does not interfere with the movement of the parts $a$ and C into their lowermost positions.

When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. For the purpose of such engagement the part $a$, as shown in Fig. 8, has a carriage engaging portion $a^5$ detachably secured to it. The part $a^5$ is in the form of a plate with a downwardly projecting body portion terminating in a lower edge $a^6$ shown in Fig. 8 as inclined to the horizontal, and having at its upper edge a lateral flange portion bearing against the underside of the part $a$ at the rear edge of the latter and detachably secured thereto by clamping screws $a^7$.

The lower edge $a^6$ of the projection $a^5$ is so disposed that it may engage and rest upon the shoulder 23C formed by the upper edge of the projection 23c at the high side of the recorder carriage 23 (the right hand side as seen in Fig. 2), when the position of said carriage is such as to hold the shoulder 23C beneath said edge $a^6$. In the condition just described the control table part $a$ cannot move downward below the position shown in full lines in Fig. 3, which is the upper operating position of the part $a$. The movements of the part $a$ between the position shown in full lines in Fig. 3 and its uppermost position corresponding to the upper dotted line showing of the arm C' in Fig. 5, are inoperative insofar as the actuation of the control devices is concerned. Said uppermost position of the part $a$ may be called a clearance position, as part $a$ in that position cannot interfere in any way with the movements of the marker carriage, all of which are given the latter while the part $a$ is held in said clearance position.

When an increase in the value of the quantity measured results in a movement of the recorder carriage 23 to the high side of the control table A, that movement causes the part $a$ to be positively secured against down movement from its uppermost operative position by adjusting a latch member D, into its latching position. The latch D is pivotally mounted on a stud $A^4$ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud $A^5$ depending from the underside of the control table frame alongside the stud $A^4$, and a spring $Dd$ connecting the members D and $d$. The spring $Dd$ tends to move the member D in the counter-clockwise direction as seen in Figs. 8 and 9, and to move the member $d$ in the opposite direction about their respective pivotal supports $A^4$ and $A^5$. Such turning movements of the members D and $d$ are prevented by the engagement of the finger portion $d'$ of the part $d$ with the shoulder D' of the member D, when the latter is in its latching position as shown the finger $d'$ engages a shoulder $D^2$ of the part D as shown in Fig. 9.

The members D and $d$ are moved from the position shown in Fig. 8 into that shown in Fig. 9 and back again into the position shown in Fig. 8 by the engagement of the recorder carriage shoulder 23B with the cam shaped front edges $D^5$ and $d^5$ of the members D and $d$, respectively. The edges $D^5$ and $d^5$ are so respectively shaped and disposed that as the carriage moves to the high side of the control table, the shoulder 23B acts on the edge $d^5$ to turn the member $d$ counter-clockwise as seen in Figs. 8 and 9, so that the spring $Dd$ may move the member D into its latching position in which its shoulders D' engage the finger $d'$. When the carriage 23 subsequently moves back from its high position, the shoulder 23B engages edges $D^5$ of the member D and moves the latter into its non-latching position while permitting the spring $Dd$ to move the member $d$ into the position in which its finger $d'$ engages the shoulder $D^2$ of the member D, and holds the latter in its non-latching position.

The means through which the spring $FA^3$ normally prevents movement of the control table part $a$ out of its clearance position, and through which the rising and falling movements of the bar C and part $a$ effect control functions, include a floating member E connected by a link $C^5$ to the arm $C^2$, and parts associated with the member E. The latter is pivotally connected at EF to the part F of a compound lever comprising parts F and FA each pivoted to the instrument frame work at F' and normally held against relative movement by a spring FB. The latter tends to hold the part F in engagement with a projection FA' of the part FA, but serves as a safety device which may yield to prevent injury of the parts in case the switch parts actuated by the member should jam. The spring $FA^3$ extends between the upper end of the lever part FA and the instrument framework, and tends to hold the parts F, FA and E in the positions shown in dotted lines in Fig. 3. The lever part FA is moved from the dotted line position into the full line position of Fig. 3 once during each rotation of the shaft 12, by the cam 11, which then engages a cam roll follower $FA^2$ carried by the lever part FA.

When the parts are in the position shown in dotted lines in Fig. 3, the lower cam edge E' of the member E rests upon a roller support $e$ mounted on the instrument framework, and the position of the member E is then such that the link $C^5$ holds the part $C^2$ and thereby the bar C and control table part $a$ in their uppermost positions. When the lever part F is turned in the clockwise direction from its Fig. 3 dotted line position, the weight of the part E adds to the gravital tendency of the bar C and table part $a$ to turn downward, and the parts last mentioned then move downward into the position shown in full lines in Fig. 3, unless such movement is prevented by the control table latch D, or by the engagement of the edge $a^6$ with the recorder carriage shoulder 23C.

On each clockwise movement of the lever F from its dotted line position shown in Fig. 3, the floating member E is advanced along a path of movement which depends upon the elevation at the time of the upper end of the link $C^5$ and hence upon the position of the carriage 23 relative to the table A, which determines the angular adjustment at the time of the arm $C^1$ to which the upper end of the link $C^5$ is connected. On each such advancing movement of the member E, its path of movement is thus selectively dependent upon the value of the quantity measured.

In the form of the invention illustrated in Figs. 1-9, when the temperature to which the thermo-couple 3 responds is relatively low, so that the low left hand end portion as seen in Fig. 8, of the edge $a^6$ engages the shoulder 23C of the carriage 23, the path of advancing movement of the member E will be relatively low and an engaging shoulder $G'$ carried by the member will engage an arm $H^1$ of a rotary pilot valve H and thereby adjust the rotary valve member $H^3$ of the latter in the counter-clockwise direction as seen in Figs. 3, 6 and 7, unless as a result of the previous operation of the apparatus, the valve member $H^3$ is in such position that the advancing movement of the member E does not bring the latter into operative engagement with the part $H^1$. Conversely, when the temperature to which the thermo-couple 3 responds is relatively high, and the advancing movement of the member E is along a path which is relatively elevated, an engaging shoulder $G^2$ carried by the member E engages an arm $H^2$ secured to the valve member $H^3$ and adjusts the latter in the clockwise direction as seen in Figs. 3, 6 and 7, unless as a result of the previous operation of the instrument, the position of the valve member $H^3$ is such that the advancing movement of the member E will not bring the shoulder $G^2$ into operative engagement with the arm $H^2$. If the temperature to which the thermo-couple 3 responds is at or sufficiently near its normal value so that the advancing movement of the member E is along an intermediate or normal value path, one or the other of the shoulders $G^1$ will engage the corresponding arm $H^1$ or $H^2$, respectively, depending upon the previous adjustment of the valve member $H^3$, and thereby adjust the latter into an intermediate or normal position, unless already in that position.

As shown, the arms $H^1$ and $H^2$ are the opposite end portion of a piece of sheet metal having a hub portion secured to the stem of the valve member $H^3$ which projects from a cylindrical valve chamber in the valve body in which the valve member $H^3$ fits and is rotatably adjustable. As shown, the valve body is secured at one end to a supporting bracket $h$ which may be attached to the instrument framework proper, but preferably, as indicated in Figs. 1 and 3, is attached to the back wall $Ir$ of the instrument casing I from which the instrument proper may be removed when the instrument casing is opened at its front side. In the commercial form of the potentiometer instrument illustrated generally in the above mentioned application, Serial No. 546,290, the framework of the instrument proper is supported by a swinging arm $lw$ as indicated in Fig. 1, so that the instrument proper may be swung bodily out of the casing when the front door of the latter is open to permit access to the rear of the instrument and the rear portion of the casing. With the described provisions for giving oscillatory movements to the valve member $H^3$ and with the body of the valve attached to the back wall of the instrument casing, the instrument proper may be swung out of the casing when desirable without disturbing the valve or the pipe connection to the latter.

The cylindrical valve member $H^3$ is formed with a circumferential groove $H^4$ communicating in all positions of the valve member with a valve body port $H^5$ to which air under pressure is transmitted by a pipe 7. The valve member $H^3$ is also formed at one side with an axially extending groove $H^6$ opening at one end into the circumferential groove $H^4$ and long enough to register, when the angular position of the valve member $H^3$ permits, with a valve body port $H^7$. The latter is connected by the pipe 4 to the pressure chamber $5^a$ of the fuel control valve 5. An adjustment of the valve member $H^3$ bringing the passage $H^6$ into register with port $H^7$, permits air to flow from the pipe 7 into the chamber $5^a$ of the fuel valve 5, and thereby increase the pressure in said chamber.

The valve member $H^3$ is also formed with a diametral passage $H^8$ generally transverse to the radial plane intersecting the bottom of the groove $H^6$, and serving when the angular position of the valve member $H^3$ permits, to connect the port $H^7$ to an exhaust port $H^9$ as shown in Fig. 6. In this adjustment of the valve member $H^3$, the pressure in the pressure chamber $5^a$ falls as a result of the escape of air to the atmosphere from the chamber $5^a$ through the pipe 4, port $H^7$, diametral passage $H^8$ and exhaust port $H^9$.

As diagrammatically shown in Fig. 1, the valve 5 is so disposed that its valve member $5^b$ is moved to open the valve port $5^c$ under the action of a loading spring $5^d$ when the pressure in the chamber $5^a$ falls, and is moved to throttle the port $5^c$ by an increase in pressure in the chamber $5^a$. The adjustment of the valve member $H^3$ resulting from a decrease below normal of the temperature of thermo-couple 3 diminishes the pressure in the chamber $5^a$ and thereby adjusts the valve 5 to increase the fuel supply to the furnace 2, as is necessary to restore the normal value of said temperature. Conversely, on an increase above normal of said temperature, the valve member $H^3$ is adjusted to increase the pressure in chamber $5^a$ and thereby decrease the fuel supply to the furnace 2.

In the valve arrangement shown, the flow of air outward through the port $H^7$ into the pipe 4 from the valve passage $H^6$ communicating with the air supply pipe 7, is regulated by the extent to which the port H is throttled by the peripheral portion $H^{11}$ of the valve member $H^3$, which is in the position of the valve member shown in Fig. 6 between the passage $H^6$ and the end of the passage $H^8$ adjacent the port $H^7$, and the reverse flow through the port $H^7$ from the pipe 4 to the valve passage $H^8$ and port $H^9$ is similarly regulated. To prevent interference with the last mentioned regulation by wire drawing at the inner end of the port $H^9$, the valve member $H^3$ is cut away or recessed at $H^{10}$, so as, in effect, to enlarge the end of the passage $H^8$ which communicates with the exhaust port $H^9$.

The extent of the different adjustments which the movements of the member E along its different paths give, or tend to give, to the valve member $H^3$, depend, with the arrangement shown in Figs 1-9, upon the form and disposition of the shoulders $G^1$ and $G^2$. As shown those shoulders are formed by the end edges of spaced apart arm portions of a member G which is detachably secured to the member E, so that it may be replaced by another part generally like the member G but differing therefrom in respect to the form or disposition of its shoulders corresponding to the shoulders $G^1$ and $G^2$. The part G is shown as having the adjacent end of its shoulders $G^1$ and $G^2$ separated by a distance less than the distance between the shoulder engaging portions of the arms $H^1$ and $H^2$. In consequence, when the advancing movement of the member E is along an intermediate or normal value path, the corresponding paths of movement of the shoulders $G^1$ and $G^2$ are in line with the engaging parts of the arms $H^1$ and $H^2$, and the valve member $H^3$, if previously displaced in the clockwise direction from its neutral position will be adjusted into that position by the engagement of the shoulder $G^1$ with the arm $H^1$, and if previously displaced in the opposite direction from its neutral position will be returned to that position by the engagement of the shoulder $G^2$ with the arm $H^2$.

By a suitable inclination of the shoulders $G^1$ and $G^2$, the adjustment of the valve member $H^3$ away from its neutral position which is effected on an increase or decrease in the temperature to which the thermo-couple 3 is subjected, may be made proportioned to the extent of the temperature increase above or decrease below the normal temperature. By making the angular extent of the peripheral surface $H^{11}$ somewhat greater than the angular extent of the corresponding end of the port $H^7$, the effect of a so-called wide neutral may be obtained permitting minor fluctuations in the controlling temperature to either side of a particular normal value of the latter without requiring a compensating valve adjustment.

With a member GA secured to the member E in place of the member G, which has the adjacent ends of its shoulders $G^1$ and $G^2$ separated by a distance greater than the distance between the valve arms $H^1$ and $H^2$ as shown in Fig. 3A, the previously existing adjustment of the valve member $H^3$ will not be disturbed by an advanced movement of the member E along its intermediate or normal value path. This makes it possible for the control system to maintain the desired normal value of the temperature to which the thermo-couple 3 is subjected, with the fuel supplied at one rate at one time and at another rate at another time as may be necessary to maintain such temperature under different conditions of operation.

The valve member $HA^3$ shown in Fig. 10 may be used in the valve body shown in Figs. 5, 6 and 7 in lieu of the valve member $H^3$ previously described. The valve member $HA^3$ differs from the valve member $H^3$ in the provisions made for obtaining a more gradual throttling of the communication between the port $H^7$ connected by the pipe 5 to the pressure chamber control valve and a greater angular adjustment of the valve member for the full range of throttling adjustment of the port $H^7$. The special provisions for the purpose made in the valve member $HA^3$ include a circumferentially extending groove $H^{60}$ in the periphery of the valve member which intersects with the longitudinal groove $H^6$ and is in position to register with the port $H^7$ and connect the latter to the pressure supply pipe 7 through an angular range of movement of the valve member $HA^3$ appreciably greater than that corresponding to the width of the groove $H^6$. In Fig. 10 the outlet end of the exhaust passage $H^8$ in the valve member intersects a circumferentially extending groove $HA^{10}$ corresponding generally to the cut away portion $H^{10}$ of the valve member $H^3$.

The modification illustrated in Fig. 11 differs from the construction shown in Fig. 3, in that the link $C^5$ which moves in accordance with the movements of the control bar C, is directly connected at its lower end to an operating arm $H^{20}$ secured to the stem of the oscillating valve member of the valve H, so that the valve member is angularly adjusted in correspondence with every up and down movement of the link $C^5$ and control bar C. With the valve operating provisions shown in Fig. 11, the parts E, F and FA and parts directly associated with those mentioned, are unnecessary and may be omitted. Advantageously, however, the arrangement shown in Fig. 11 may be provided with a bias spring $FA^{30}$ supplementing the action of gravity in giving downward movements to the bar C and link $C^5$ when such movements are permitted.

With the operating provisions illustrated in Fig. 11, I advantageously replace the control table part $a^5$ of the construction first described by the control table part $A^{50}$ shown in Figs. 12 and 13. The part $A^{50}$ differs from the part $a^5$ primarily in that its inclined edge $a^{60}$ corresponding to the edge $a^6$ of the part $a^5$ is extended at its high end to provide a portion $a^{61}$ adapted to move the control bar structure to the previously mentioned clearance position as the carriage 23 moves from its normal position beneath the control table to a position at the high side of the latter. The elevation of the parts in their clearance positions as the carriage moves in either direction between said positions, facilitates the movement of the latching part D' into and out of operative engagement with the control table $a^5$. The control table part $A^{50}$ is formed with an extension providing a cam edge $a^{62}$ oppositely inclined to the edge $a^{60}$ which is engaged by an operating roller mounted on the carriage 23 and thereby raises the control table parts into their clearance position as the carriage 23 rides from a position at the high side of the control table to the more normal position beneath the control table. Since, with the arrangement shown in Fig. 11, the edge $a^{60}$ of the part $A^{50}$ normally rides on the carriage 23, friction and wear are advantageously avoided as by the use of the roller 23C' mounted on the pen carriage 23 adjacent a shoulder 23C which serves the purposes of the previously mentioned shoulder 23C.

To minimize any skewing tendency of the control table A as a result of the considerable extension of the member $A^{50}$ to the high side of the control table, the part $A^{50}$ is advantageously formed with transversely extending ears $A^{51}$ and $A^{52}$ adjacent its high side, extending respectively above and in guiding relation with the control bar C. As is plainly apparent from Fig. 12, the cam edge $a^{60}$ may be made as long as is required or any desired graduation in and below adjustment of the valve member $HA^3$ and corresponding extended range of relative movement of the carriage 23 and control table A.

Figure 14:
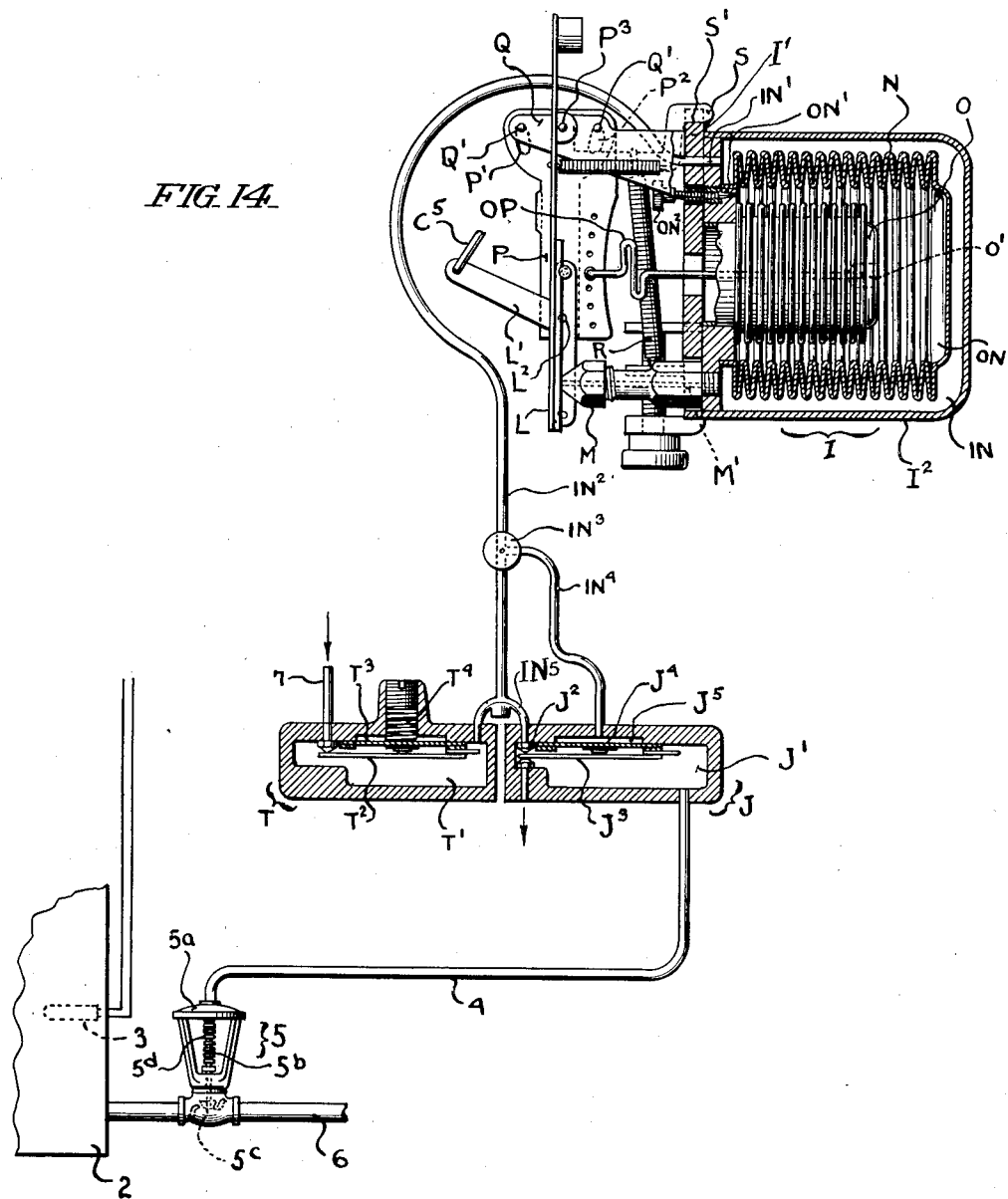
Fig. 14 is a view partly in perspective and partly diagrammatic illustrating a modified form of control instrument pneumatic provisions.

In the form of the invention illustrated somewhat diagrammatically in Fig. 14, the link $C^5$ may be given its rising and falling movements in the same manner as in the arrangement illustrated in Fig. 11, but is employed to adjust pneumatic control provisions quite different from those previously described. The pneumatic provisions illustrated in Fig. 14 include an air controller unit I having provisions whereby a control air pressure is varied in definite accordance with the position of the control bar C through which the link $C^5$ is given its rising and falling movements. The air pressure thus controlled by the unit I might be transmitted directly to the pressure chamber $5^a$ of the fuel valve 5 or other device directly controlled, but preferably in many cases and as shown, is transmitted to the pressure chamber $J^5$ of a relay device J which includes a working chamber J' directly connected by the pipe 4 to the control valve pressure chamber $5^a$.

The air controller unit I and relay device J shown were devised jointly by Frederick W. Side and myself and are disclosed and claimed in our joint application, Serial No. 693,388, filed October 12, 1933. While no specific novelty in such unit and relay is claimed herein, the manner in which those elements are combined with a potentiometer control instrument, as illustrated and described herein, is novel with me and highly advantageous, as will be apparent to those skilled in the art from the following description of their features which are essential or practically desirable for the purposes of the combination herein illustrated and described.

The air controller unit I includes a supporting bracket member I' for mounting the unit I to the instrument frame work. The link $C^5$ is directly connected to the operating arm L' of a pilot valve member L of the type commonly referred to as a flapper valve. The valve member L is associated with a valve seat member or nozzle M having a bleeder outlet port or passage M' for the escape of air under pressure from a chamber IN at a rate depending on the position of the valve member L relative to the nozzle M. The outer wall of the chamber IN is formed by the cup-like casing $I^2$ of the air controller unit which is rigidly attached to the bracket I'. Extending into said casing $I^2$ and forming a movable wall portion of the chamber IN is a resilient bellows element N closed at its inner end and connected at the margin of its opposite end to the adjacent portion of the casing $I^2$. The chamber IN thus comprises a portion between the closed end of the casing $I^2$ and the adjacent end of the bellows N, and an annular portion between the cylindrical portions of the casing and bellows.

In normal operation air under pressure is continuously supplied at a suitably restricted rate to the chamber IN through an inlet port IN'. Coaxial with the bellows element N and within the latter is a second and smaller resilient bellows element O which is closed at its inner end and is connected at the margin of its outer end to the outer end of the bellows N so that an air chamber ON is formed between the bellows N and the bellows O. This chamber communicates with the atmosphere through a restricted port ON', the flow capacity of which is advantageously made variable as by use of an adjustable throttling device $ON^2$. Variations in the air pressure within the space ON relative to the pressure in the space IN produce collapsing and expanding movements of the bellows N and variations in the air pressure within the space ON, produce expanding and contracting movements of the bellows O.

The closed end O' of the bellows O forms what may be described as a movable abutment which is connected to the valve member L and the position of the latter depends at any instant not only upon the position of the arm L' but upon the position of the bellows end O'. The connection between the latter and the valve member L as shown comprises a link OP connected at one end to the bellows end O' and adjustably connected at its opposite end to a rocking element P to which the valve member L is pivotally connected at $L^2$. The rocking member P which normally extends in a direction generally transverse to the axis of the unit is adapted to rock in one direction about a supporting pivot pin Q', and in the opposite direction about a second supporting pivot pin $Q^2$, which is displaced from the pin Q' in the direction of the axis of the unit and toward the closed end of the latter. The pivot pins Q' and $Q^2$ are carried by a bracket member Q attached to the bracket I' and extend through corresponding slots P' and $P^2$ in the member P. The latter is subjected to a spring force by means including an adjustable spring R and a lever S pivotally connected at $P^3$ to the member P and fulcrumed at S' on the bracket member I', which tends to hold the end walls of both slots P' and $P^2$ in engagement with the pins Q' and $Q^2$, respectively. On an inward movement of the bellows end O', the spring R yields to permit the member P to turn counter-clockwise about the pin Q' as a pivot, and on an outward movement of the bellows end O', the spring R yields to permit a clockwise turning movement of the member P about the pin $Q^2$ as a pivot.

In the arrangement shown in Fig. 14, the chamber IN is connected by a pipe $IN^2$ to a source of air under constant pressure which is shown as a chamber T' in a casing T receiving air under pressure from the supply pipe 7 as required to maintain suitable constant pressure within the chamber T' which is determined by the action of a valve $T^2$. The latter is actuated in the closing direction by the pressure of the air in the chamber T' against a diaphragm $T^3$ which forms a part of the wall of the chamber and is exposed at its outer side to the pressure of the atmosphere. The valve $T^2$ is actuated in the opening direction by a spring $T^4$ acting on the outer side of the diaphragm $T^3$. As shown the pipe $IN^2$ includes a restricted orifice $IN^3$. The chamber T' supplies air to the relay pressure chamber J' as required to maintain the proper pressure through the latter through a port $J^2$ controlled by a valve $J^3$. As shown the port $J^2$ receives air from the chamber $T^2$ through a branch $IN^5$ leading from the pipe $IN^2$ at the high pressure or inlet side of the orifice $IN^3$, but the form of the communicating means between the chamber T' and port $J^2$ is of no operative consequence.

The valve $J^3$ is actuated by a diaphragm $J^4$ forming a movable wall portion of the chamber J' and interposed between the latter and a pressure chamber $J^5$. The diaphragm adjusts the valve $J^3$ toward and away from the port $J^2$ as required to maintain a pressure in the chamber J' which is a function at all times of the pressure in the chamber $J^5$. The latter is connected to the chamber IN. As shown, the connection includes a branch pipe $IN^4$ extending between the chamber $J^5$ and a portion of the pipe $IN^2$ at the outlet side of the restricted orifice $IN^3$.

In the operation of the apparatus shown in Fig. 14, on a decrease in the controlling temperature resulting in a downward adjustment of the link $C^5$ and a corresponding counter-clockwise adjustment of the arm L', the valve L is moved away from the nozzle M thereby reducing the air pressure in the space IN. That pressure reduction permits the resilient bellows N to elongate as a result of its existing internal pressure and thereby enlarges the interbellows space ON and reduces the pressure in the latter. The pressure reduction in the space ON similarly elongates the resilient bellows O and through the link OP thereby causes the member P to rock in the counter-clockwise direction about the pin Q'. The resultant movement of the valve pivot L² produces a corresponding movement of the valve member L toward the nozzle M and thereby tends to increase the pressure in the space IN. Thereafter assuming no further change in position of the arm L', pressure in the space ON tends to gradually build up to an equality with the atmosphere, and the bellows O starts to contract to its normal length and to return the member P to its normal position in engagement with both pins Q¹ and Q². This return movement to normal position of the member P gives the valve member L a corresponding movement away from the nozzle M. As valve member L starts to move away from the nozzle, the pressure in the space IN will be still further reduced resulting in a further increase in the volume of the space ON again returning the pressure therein to its former reduced value, and, by expanding the bellows O, giving the valve member L a movement toward the nozzle M checking a further reduction in pressure in the chamber IN. This process will continue, providing the arm L' does not change its position, until the pressure in the chamber IN and hence in the fuel valve pressure chamber 5ª is reduced sufficiently to cause the furnace temperature to approach normal, or until the pressure in the chamber IN has reached the minimum value which the control system will permit. Ordinarily the controlling temperature will begin to approach normal before this limiting condition has been reached, and so long as this condition is not reached, a definite pressure will be maintained in the space ON corresponding to the position at the time of the arm L', and as air leaks into that space, the pressure in the space IN will be caused to continuously decrease by the operation of the valve member L to maintain said definite pressure in the space ON.

Operations which are the reverse of those described will occur on an increase of the controlling temperature and a corresponding adjustment of the arm L' in the counter-clockwise direction. In such case, the pressure in the space IN, and hence in the fuel valve pressure chamber 5ª, will continually increase until the closing movement of the fuel valve 5 results in a reduction in the furnace temperature to which the thermo-couple 3 responds.

The tension means including the lever S and spring R desirably modify the magnitude and rate of movement of the parts, and the character of the pressure change produced within the control unit. The primary effect of the tension means is to restrain elongation or contraction of the bellows O in response to the initial reduction or increase in pressure in the space IN, and to thereby increase the amount of such reduction or increase in said pressure necessary to produce a given magnitude of movement of the valve member L toward or away from the nozzle M by elongation or contraction of the bellows resulting from the pressure change in the space IN.

The provisions described for adjusting the tension of the spring R and for adjusting the connection of the spring to the lever S as by shifting the point of connection from one to another of the notches S² provided in the lever for the purpose, permit of a desirable adjustment in the regulatory action or governor characteristics of the control system. In particular, it permits of a variation in the magnitude and rate of response of the control quantity which as shown is the rate of fuel supply to changes in the controlling quantity, which as shown is the temperature of the thermo-couple 3, as may be made desirable to adapt the control system the time lag in the response of the temperature of the particular furnace with which the system is associated to the effect of a change in the rate of furnace fuel supply, or by other conditions of operation. These features of the arrangement shown in Fig. 14 need not be further referred to herein, however, as they are fully described in said application, Ser. No. 693,388. Moreover, the refinements in control made possible by such adjustments are not essential to the attainment of the general advantages of the combination illustrated by Fig. 14.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. In a potentiometer control instrument, the combination with potentiometer measuring means including a device responsive to potentiometer unbalance, a relay mechanism effecting potentiometer rebalancing actions under the control of said device, and a member deflected by said mechanism in accordance with the value of the quantity measured, of pneumatic control mechanism including a rotatable pilot valve member, a valve actuator oscillated by said relay mechanism and operable to angularly adjust said valve member in selective accordance with its path of oscillation, and means for varying said path of oscillation in selective accordance with the deflection of said member.

2. In a potentiometer control instrument, the combination with potentiometer means including a device responsive to potentiometer unbalance, a relay mechanism effecting potentiometer rebalancing actions under the control of said device, and a measuring member adjusted by said mechanism along a straight path into a position varying with the value of the quantity measured, a control device adjustable along a path parallel to the first mentioned path, of pneumatic control mechanism including pilot valve means, and means actuated by said mechanism and controlled by variations in the relative positions of said member and device in the direction of said paths for adjusting said pilot valve means in accordance with said relative positions.

3. In a control instrument, a deflecting meter element, relay mechanism controlled by said element and a pilot valve and a common supporting means for said valve and mechanism on which said mechanism is mounted for bodily adjustment relative to said valve into and out of a position for operative engagement with said valve to position the latter.

4. The combination with a control instrument including selectively controlled relay mechanism, of a casing therefor, and control means mounted on said casing, said relay mechanism being connected to said casing for bodily movement relative thereto into and out of a position for operative engagement with said control means.

5. In a potentiometer control instrument an element deflecting in accordance with the magnitude of the quantity measured, a predetermined position of said element corresponding to a predetermined normal of said quantity, a nozzle supplied with air under pressure and a closure member cooperating therewith, means cooperative with said deflecting element to position said closure member in accordance with the deflection thereof, and air motor means for independently moving said member to compensate for a movement of said member by said first-mentioned means resulting from a return of said element to said normal.

6. The combination in a potentiometer control instrument including a device deflecting in accordance with potentiometer unbalance, of a member mounted to oscillate about an axis and comprising pilot valve means and actuating parts extending away from said axis in different directions and periodically actuated means selectively adjusted by the deflection of said device and operatively engaging one or the other of said parts on each actuation of said means as required to thereby adjust said member in the direction and to the extent necessary to position said member in selective accordance with the deflection of said device.

7. In a potentiometer control instrument, the combination with potentiometer measuring means including a device with a pointer deflecting in response to potentiometer unbalance and a relay mechanism including a contactor, cam means alternately carrying said contactor away from said pointer and permitting said contactor to engage said pointer under the action of a small biasing force, of pneumatic control mechanism including pilot valve means actuated by said relay mechanism for adjusting said pilot valve in selective accordance with the deflections of said device.

8. In a potentiometer control instrument the combination with potentiometer measuring means including a device deflecting in accordance with the value of the measured condition, a rotary control element, a pneumatic pilot valve controlled by said element, oscillating mechanism under control of said device, moving toward and away from said element and contacting the latter on either side of its axis of rotation to position the latter angularly about its axis in accordance with the deflection of said device.

9. In a potentiometer control instrument, the combination of a galvanometer, a pen carriage having a straight line path of movement, a relay mechanism controlled by said galvanometer and adjusting said carriage along said path into different positions corresponding to the different values of an electric force impressed on said galvanometer, a bar extending along said path, said bar and carriage having cooperating means for moving said bar transversely of said path into different positions depending upon the position of said carriage along said path, and air controlled means including a flapper valve mechanism having an adjustable element connected to said bar for adjustment by movements of said bar transversely of said path, and means responsive to a pressure change created by an initial adjustment of said valve mechanism produced by movement of said bar, for effecting a follow-up adjustment of said mechanism partially neutralizing the effect of said initial adjustment, and for effecting a delayed compensating adjustment of said mechanism neutralizing the said follow-up adjustment.

10. In a potentiometer control instrument, an element deflecting in accordance with the magnitude of the quantity measured, a predetermined position of said element corresponding to a predetermined normal of said quantity, a control element, a control member cooperating with the control element, means cooperating with said deflecting element to position said control member in accordance with the deflection thereof, and means for independently moving said member to compensate for a movement of said member by said first mentioned means resulting from a return of said element to said normal.

11. In a measuring and control instrument, the combination with a member deflecting along an elongated path in accordance with the value of the quantity measured, a control member adjustable along the length of said path and extending along said path, pivoted supporting means for said control member permitting the latter to turn toward and away from the first mentioned member, said control member including a portion cooperating with the first mentioned member to position the control member angularly about the axis of its pivot in accordance with the position of the first mentioned member in said path, a second control member pivoted on a relatively stationary axis substantially parallel to the pivotal axis of the first control member and linkage connecting said first and second control members.

12. In a measuring and control instrument, the combination with a member deflecting along an elongated path in accordance with the value of the quantity measured, a control member adjustable along the length of said path and extending along said path, pivoted supporting means for said control member, said control member including a portion cooperating with the first mentioned member to position the control member angularly about the axis of its pivot in accordance with the position of the first mentioned member in said path, a second control member pivoted on an axis stationary relative to the pivotal axis of the first control member, and a mechanical connection between said first and second control members through which changes in the angular adjustment of the first control member effect a simultaneous and predetermined angular adjustment of said second control member.

13. In a measuring and control instrument, the combination with a member deflecting along an elongated path in accordance with the value of the quantity measured, a control member adjustable along the length of said path and extending along said path, pivoted supporting means for said control member, said control member including a portion cooperating with the first mentioned member to position the control member angularly about the axis of its pivot in accordance with the position of the first mentioned member in said path, a second control member pivoted on an axis stationary relative to the pivotal axis of the first control member, and a mechanical connection between said first and second control members through which changes in the angular adjustment of the first control member effect a simultaneous and predetermined angular adjustment of said second control member, and means actuated by each such angular adjustment of said second control member for effecting a reverse angular adjustment of the latter smaller than the previously mentioned adjustment thereof.

14. In a measuring and control instrument, the combination with a member deflecting along an elongated path in accordance with the value of the quantity measured, a control member adjustable along the length of said path and extending along said path, pivoted supporting means for said control member, said control member including a portion cooperating with the first mentioned member to position the control member angularly about the axis of its pivot in accordance with the position of the first mentioned member in said path, a second control member pivoted on an axis stationary relative to the pivotal axis of the first control member, a mechanical connection between said first and second control members through which changes in the angular adjustment of the first control member effect a simultaneous and predetermined angular adjustment of said second control member, and means actuated by each such angular adjustment of said second control member for effecting a reverse angular adjustment of the latter smaller than the previously mentioned adjustment thereof and for effecting a delayed third adjustment in the same direction as the first mentioned adjustment.

15. In a potentiometer control instrument, an element deflecting in accordance with the magnitude of the quantity measured, a predetermined position of said element corresponding to a predetermined normal of said quantity, a nozzle supplied with air under pressure and a closure member cooperating therewith, means cooperative with said deflecting element to relatively move said closure member and nozzle in accordance with the deflection thereof, and air motor means for independently moving said closure member and nozzle relatively, to compensate for a relative movement of said member and nozzle by said first mentioned means, resulting from a return of said element to said normal.

16. In a potentiometer control instrument, an element deflecting in accordance with the magnitude of the quantity measured, a predetermined position of said element corresponding to a predetermined normal of said quantity, a control element, a control member cooperating with the control element, means cooperating with said deflecting element to position said control member relative to said control element in accordance with the deflection of the deflecting element, a regulator adjusted in response to changes in the relative positions of said member and control element and means for adjusting said regulator to compensate for a relative movement of said member and control element resulting from a return of said deflecting element to said normal.

17. In a potentiometer control instrument, combination of a galvanometer, a pen carriage having a straight line path of movement, a relay mechanism controlled by said galvanometer and adjusting said carriage along said path into different positions corresponding to the different values of an electric force impressed on said galvanometer, a bar extending along said path, said bar and carriage having cooperating means for moving said bar transversely of said path into different positions depending upon the position of said carriage along said path, and air controlled means including a flapper valve mechanism having an adjustable element connected to said bar for adjustment by movements of said bar transversely of said path, and means responsive to a pressure change created by an initial adjustment of said valve mechanism for effecting a follow-up adjustment of said mechanism partially neutralizing the effect of said initial adjustment and for effecting a delayed compensating adjustment of said mechanism neutralizing the said follow-up adjustment.

18. In a potentiometer control instrument, the combination with potentiometer means including a device responsive to potentiometer unbalance, a relay mechanism affecting potentiometer rebalancing actions under the control of said device, and a measuring member adjusted by said mechanism along a path into a position varying with the value of the quantity measured, a control device adjustable along a path parallel to the first-mentioned path, of pneumatic control mechanism including pilot valve means, and means controlled by variations in the relative positions of said member and device in the direction of said paths for adjusting said pilot valve means in accordance with said relative positions.

19. In a potentiometer control instrument, the combination with potentiometer means including a device responsive to potentiometer unbalance, a relay mechanism effecting potentiometer rebalancing actions under the control of said device, and a measuring member adjusted by said mechanism into a position varying with the value of the quantity measured, a device adjustable into a position dependent upon the desired value of the quantity to be controlled, a control device cooperating with said member and first-mentioned device, of pneumatic mechanism including pilot valve means and means actuated by said control device and controlled by variations in the relative positions of said member and first-mentioned device for adjusting said pilot valve means in accordance with said relative positions.

20. The combination of the preceding claim 19, in which the means by which the member, control device, and first-mentioned device cooperate, include a cam edge and cooperating projection by means of which said control device is rotated into a position dependent upon the relative positions of said member and first-mentioned device.

THOMAS R. HARRISON.